United States Patent [19]

Icking et al.

[11] Patent Number: 4,643,132
[45] Date of Patent: Feb. 17, 1987

[54] PULSATOR FOR MILKING MACHINES

[75] Inventors: Friedrich Icking, Oelde; Eberhard Willach, Gutersloh, both of Fed. Rep. of Germany

[73] Assignee: Westfalia Separator AG, Oelde, Fed. Rep. of Germany

[21] Appl. No.: 820,755

[22] Filed: Jan. 17, 1986

[30] Foreign Application Priority Data

Jan. 31, 1985 [DE] Fed. Rep. of Germany ....... 3503245

[51] Int. Cl.$^4$ ................................................. A01J 5/04
[52] U.S. Cl. .............................. 119/14.41; 119/14.44; 91/191; 91/437; 92/97; 137/103; 137/624.13; 137/624.15; 251/230
[58] Field of Search .......................... 119/14.41, 14.44; 137/624.13, 624.15, 103, 104, 105; 251/230; 91/191, 195, 437; 92/48, 97

[56] References Cited

U.S. PATENT DOCUMENTS

| 2,822,823 | 2/1958 | Klein et al. ................ 251/230 X R |
| 4,298,025 | 11/1981 | Prior et al. ...................... 137/624.14 |
| 4,304,262 | 12/1981 | Icking .......................... 251/230 X R |

FOREIGN PATENT DOCUMENTS

| 32752 | 7/1981 | European Pat. Off. . |
| 2931265 | 2/1981 | Fed. Rep. of Germany ... 119/14.41 |
| 64572 | 9/1926 | Sweden .......................... 137/624.13 |
| 827861 | 5/1981 | U.S.S.R. .............................. 91/437 |

Primary Examiner—Martin P. Schwadron
Assistant Examiner—Stephen M. Hepperle
Attorney, Agent, or Firm—Sprung Horn Kramer & Woods

[57] ABSTRACT

A pulsator for milking machines has two diaphragms connected by a rod with each diaphragm dividing a pressure chamber into a processing space and a damping space. The damping spaces communicate through a channel that is provided with a throttle. The processing spaces are connected either to a source of vacuum or to the atmosphere. A switchover is attached to the rod and connects lines leading to the pulsation spaces of milking containers either to the atmosphere or to a source of vacuum. A main line is provided with a throttle. The throttles in the communicating channel and in the main line are detoured by bypasses provided with chokes that can be vacuum-activated through control channels. To improve the known pulsator by eliminating the sensitive hoses and timers and to allow adjustment of the duration of the stimulation phase with no need for a timer, the control channels are always in communication with one of the control chambers in a control disk, one chamber constantly communicating with the vacuum source and the other chambers subject to atmospheric pressure. The disk can be rotated by a transmission, which is driven by the rod as it travels back and forth, in such a way that the control channels are connected either to the control chamber that is subject to vacuum or to one of the control chambers that are subject to atmospheric pressure.

6 Claims, 7 Drawing Figures

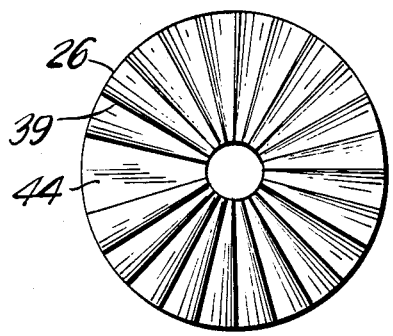
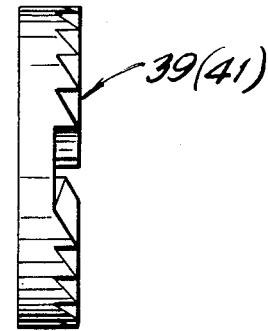
FIG.3    FIG.5
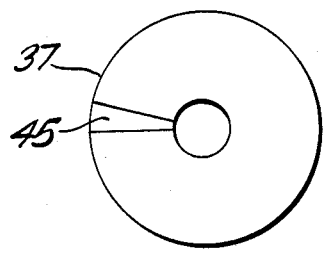
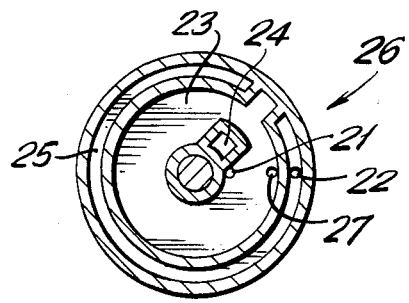
FIG.4    FIG.6
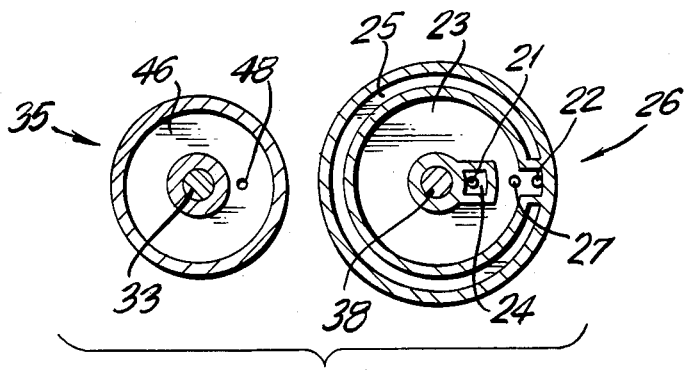
FIG.7

PULSATOR FOR MILKING MACHINES

BACKGROUND OF THE INVENTION

The present invention relates to a pulsator for milking machines and having two diaphragms connected by a rod, each diaphragm dividing a pressure chamber into a processing space and a damping space, the damping damping communicating through a channel that is provided with a throttle, and the processing spaces being connected either to a source of vacuum or to the atmosphere, with a switchover that is attached to the rod and that connects lines leading to the pulsation spaces of teat cups either to the atmosphere or to a source of vacuum, and with a main line that is provided with a throttle, the throttles in the communcating channel and in the main line being detoured by bypasses provided with chokes that can be vacuum-activated through control channels.

A pulsator of this type is known, for example, from European Pat. No. B 0 032 752. It is intended to essentially increase the number of pulsations per unit of time in the pulsation spaces while simultaneously decreasing the requisite pressure difference therein during the stimulation phase that precedes the actual milking process. The desired duration of stimulation is set in a timer and, once it expires, the chokes in the control lines are activated. The chokes consist of clamps that at least to some extent compress the control channels, which are flexible hoses, and close them off. Hoses of this type that are subject to mechanical stress, however, are very easy to damage, leading to breakdown of the pulsator.

The timers on the other hand necessarily involve precision mechanisms that make them sensitive to the conditions that commonly prevail in milking parlors, and can also lead to breakdowns.

SUMMARY OF THE INVENTION

The object of the present invention is to improve the known pulsator by eliminating the sensitive hoses and timers and to allow adjustment of the duration of the stimulation phase with no need for a timer.

This object is attained in accordance with the invention in that the control channels are always in communication with one of the control chambers in a control disk, one chamber constantly communicating with the vacuum source and the other chambers subject to atmospheric pressure, and the disk can be rotated by a transmission, which is driven by the rod as it travels back and forth, in such a way that the control channels are connected either to the control chamber that is subject to vacuum or to one of the control chambers that are subject to atmospheric pressure. The duration of the stimulation phase will accordingly be determined by the number of pulsations per unit of time and the associated changes of direction of the rod that is attached to the diaphragms, by the ratio of the transmission driven by the rod, and by the design of the control disk rotated by the transmission.

In one preferred embodiment of the pulsator the transmission is provided with a drive fork that rotates around a point, the drive fork is connected to a carrier mounted on the rod and, by flat ratchet teeth at its point of rotation, to a drive disk, the drive disk is connected by a carrier mounted eccentrically on it to a control fork, the control fork is connected by flat ratchet teeth at its point of rotation to the control disk, the teeth on the control disk are interrupted at least one point by a gap, and the control fork has at least one tooth. The teeth will accordingly transmit the pendulum motion of the drive fork to the drive disk in the form of a rotation in only one direction, with the drive disk advancing tooth pitch during each complete pulsation. One complete rotation of the drive shaft will accordingly rotate the control disk one tooth pitch. As soon, however, as the tooth on the control fork engages the gap in the control disk, the control disk will stop rotating even though the control fork continues to pivot.

In another preferred embodiment of the invention the drive disk is prevented from rotating in the wrong direction due to friction in the teeth when the control fork pivots back, in that the side of the drive disk that has no teeth has an annular channel and rests against a planar surface in the pulsator that is provided with a channel communicating with the source of vacuum and opening into the annular channel. The vacuum forces the drive disk against the planar surface, and the resulting friction prevents the drive disk from rotating backward.

The control channels can be simply and effectively connected to the control chambers when, as in one embodiment, the control chambers are on the side of the control disk that has no teeth, the same side rests against the planar surface, and other control channels and a channel that leads to the source of vacuum are positioned in the plane surface in such a way that one control chamber in the control disk is constantly connected to the vacuum source and the control channels in the planar surface are connected either to the first control chamber in the control disk or with one of the other chambers in the control disk depending on how the control disk is set. This connection has no play, is low-wear and self-regulating, and prevents the control fork from rotating the control disk backward due to the vacuum.

The teeth will reliably entrain the drive disk and control disk in the desired direction if, as in another embodiment, one spring forces the drive fork against the drive disk and another spring forces the control fork against the control disk.

Since the tooth on the control fork will be resting in the gash on the control disk upon termination of the milking process, the control disk must be advanced one tooth pitch before stimulation can be resumed. This can be accomplished in one embodiment if there is a start-up lever on the control disk that is connected to it by ratchet teeth and secured in a rest position by a resilient element, and the stroke of the lever is limited by a stop.

A preferred embodiment of the invention will now be described with reference to the attached drawings, wherein:

BRIEF DESCRIPTION OF THE DRAWINGS

FIG. 3 is a view of the teeth on the control disk,

FIG. 4 is a view of the teeth on the control fork,

FIG. 5 is a side view of the teeth on the control disk and start-up lever,

FIG. 6 is a view of the control chambers in the control disk in the stimulation position (section along the line B—B in FIG. 2), and FIG. 7 is a view similar to that in FIG. 6 illustrating the position of the control disk during the milking process (section along the line B—B in FIG. 2).

DETAILED DESCRIPTION OF THE PREFERRED EMBODIMENTS

Figure 1:
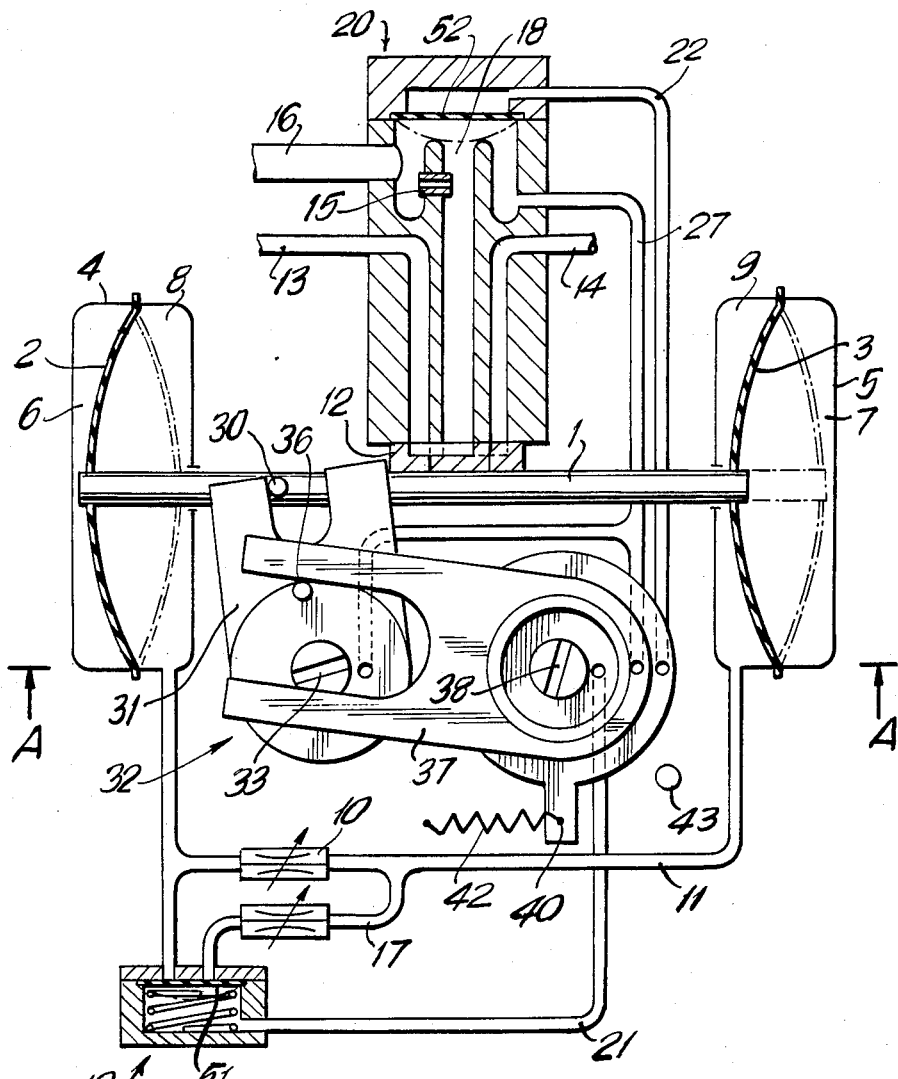
FIG. 1 is a schematic illustration of a pulsator.

One end of the rod 1 illustrated in FIG. 1 is connected to a diaphragm 2 in a pressure chamber 4 and the other end to a diaphragm 3 in another pressure chamber 5. Diaphragm 2 divides pressure chamber 4 into a processing spce 6 and a damping space 8, and diaphragm 3 divides pressure chamber 5 into a processing space 7 and a damping space 9. Processing spaces 6 and 7 are alternately subjected to vacuum by controls that are not illustrated. Damping spaces 8 and 9 communicate through a channel 11 that is provided with a throttle 10. Mounted on rod 1 is a switchover 12 that connects lines 13 and 14, which lead to the pulsation spaces of milking containers, to a main line 16 that leads either to the atmosphere or to a source of vacuum and that is provided with a throttle 15. Throttles 10 and 15 are detoured by bypasses 17 and 18 that are provided with chokes 19 and 20 that can be vacuum-activated through control channels 21 and 22.

Figure 2:
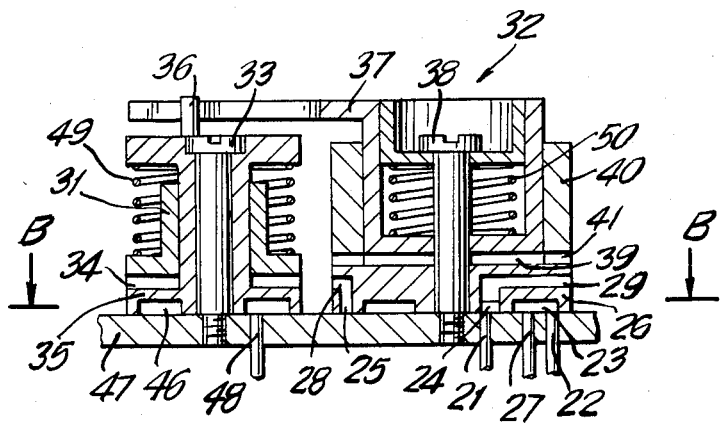
FIG. 2 is a section through the transmission along the line A—A in FIG. 1.

Control channels 21 and 22 communicate with one of the control chambers 23, 24, or 25 in a control disk 26 as shown in FIG. 2. Control chamber 23 constantly communicates with the source of vacuum through a channel 27, whereas control chambers 24 and 25 communicate with the atmosphere through channels 28 and 29.

Also mounted on rod 1 is a carrier 30 that is connected to the drive fork 31 of a transmission 32. As will be evident from FIGS. 2 to 5, drive fork 31 is connected at its point 33 of rotation to flat ratchet teeth on drive disk 35 by flat ratchet teeth 34. The ratchet teeth are similar to those shown in FIG. 5 without the gap. Another carrier 36 is mounted eccentrically on drive disk 35 and connected to control fork 37. Control fork 37 is connected at its point 38 of rotation to control disk 26 by means of flat ratchet teeth 39. A start-up lever 40 surrounds the point 38 of rotation of control fork 37 and is connected to control disk 26 by ratchet teeth 41. The ratchet teeth 39, 41 are shown in side view of FIG. 5.

Start-up lever 40 is secured in its rest position by a resilient element 42, and its stroke is limited by a stop 43.

The teeth 39 on control disk 26 are interrupted at one point by a gap 44. Control fork 37 has only one tooth 45. The side of drive disk 35 that has no teeth is provided with annular channel 46 that constantly communicates with the source of vacuum through a channel 48 in a planar surface 47. A spring 49 forces drive fork 31 against teeth 34 and another spring 50 forces control fork 37 against teeth 39.

FIG. 6 and FIG. 7 illustrate the position of the control chambers 23, 24 and 25 in control disk 26 relative to control channels 21 and 22 during the stimulation phase and FIG. 7 during the milking phase, respectively.

Before a milking cluster is applied, the tooth 45 on control fork 37 is situated in the gap 44 in control disk 26, which will not rotate any farther in spite of the pivoting action of control fork 37. In this position, as will be evident from FIG. 7, control channel 21 communicates with control chamber 24 and control channel 22 with control chamber 23, supplying air to choke 19, which blocks off bypass 17 with a spring-loaded diaphragm 51 in such a way that damping spaces 8 and 9 communicate only through throttle 10, which represents a higher resistance. The pulsator will now operate at a rate that is conventional for milking. A diaphragm 52 in the choke 20 in bypass 18 is subjected to vacuum on both sides, keeping choke 20 open. This allows full vacuum to become established in the lines 13 and 14 leading to the pulsation spaces in the teat cups. To initiate the stimulation phase, start-up lever 40 is moved against stop 43, advancing control disk 26 one tooth pitch and bringing the tooth 45 on control fork 37 into mesh with teeth 39. Control disk 26 now assumes the position illustrated in FIG. 6, subjecting the diaphragm in choke 19 to vacuum through control channel 21 and opening the choke, whereas one side of the diaphragm 52 in choke 20 is supplied with air through control channel 22, closing off choke 20. Damping spaces 8 and 9 now communicate through a line with a large cross-section, increasing the number of pulsations per unit of time, whereas, since lines 13 and 14 are supplied with vacuum only through throttle 15, only a weak vacuum can become established in the pulsation spaces. Carrier 30 moves drive fork 31 around point 33 of rotation in both directions with every back-and-forth motion of rod 1. The ratchet shape of teeth 34 allows the motion to be transmitted in only one direction of rotation, whereas a displacement of one tooth pitch in relation to drive disk 35 occurs in the opposite direction. As drive disk 35 completes a full rotation, control fork 37 also carries out a full pivot through carrier 36 and transmits it like drive fork 31 to control disk 26. Control disk 26 stops rotating as soon as it has completed a full rotation, and the tooth 45 on control fork 37 returns to the gap 44 on control disk 26 and hence back into the rest position previously described herein. The duration of the stimulation phase depends on the number of pulsations per unit of time during the stimulation phase and on the particular gear ratio. The number of pulsations per unit of time can be determined by varying the cross-section of bypass 17. If, for example, there are 300 pulsations per minute and the transmission ratio is 1:300, the stimulation phase will last 60 seconds.

It will be appreciated that the instant specification and claims are set forth by way of illustration and not limitation, and that various modifications and changes may be made without departing from the spirit and scope of the present invention.

What is claimed is:

1. In a pulsator for a milking machines, having two diaphragms connected by a rod, each diaphragm dividing a pressure chamber into a processing space and a damping space, wherein the damping spaces communicate through a channel with a throttle therein and the processing spaces are connected either to a source of vacuum or to the atmosphere to move the rod back and forth, a switchover attached to the rod for connecting lines leading to the pulsation spaces of teat cups to either the atmosphere or a source of vacuum, a main line having a throttle therein, wherein the throttles are detoured by bypasses with chokes therein that are vacuum-activated through first and second control channels the improvement comprising: a control disk having control chambers therein including one chamber constantly communicating with the vacuum source and the other chambers subject to atmospheric pressure, means mounting the disk for rotation relative to the control channels such that each control channel is always connected either to the control chamber that is subject to vacuum or to one of the control chambers that are subject to atmospheric pressure, and transmission means responsive to the back and forth movement of the rod for rotating the disk.

2. The pulsator as in claim 1, wherein the transmission means comprises a drive fork rotatable around a point, a carrier mounted on the rod and connected to the drive fork, flat ratchet teeth disposed around the point of rotation of the drive fork for connecting same to a drive disk carrier mounted eccentrically on the drive disk for connecting same to a rotatable control fork flat ratchet teeth on the control fork connecting same to teeth on the control disk, wherein the teeth on the control disk are interrupted at at least one point by a gap and the control fork has at least one tooth.

3. The pulsator as in claim 2, wherein the drive disk has one side with no teeth and having an annular channel which rests against a plane surface provided with a channel communicating with the source of vacuum and opening into the annular channel.

4. The pulsator as in claim 3, wherein the control disks has teeth on one side and wherein the control chambers are on the side of the control disk that has no teeth and which rests against the plane surface, and wherein the control channels and a channel that leads to the source of vacuum are positioned in the plane surface such that one control chamber in the control disk is constantly connected to the vacuum source and the control channels in the plane surface are connected either to the one control chamber in the control disk or with one of the other chambers in the control disk depending on how the angular position of the control.

5. The pulsator as in claim 4, further comprising one spring forcing the drive fork against the drive disk and another spring forcing the control fork against the control disk.

6. The pulsator as in claim 5, further comprising a start-up lever on the control disk connected to the control disk by ratchet teeth and secured in a rest position by a resilient element, and wherein the stroke of the start-up lever is limited by a stop.

* * * * *